United States Patent
Lewellyn et al.

(10) Patent No.: US 8,685,256 B2
(45) Date of Patent: Apr. 1, 2014

(54) MICRODISPERSIONS OF HYDROXAMATED POLYMERS AND METHODS OF MAKING AND USING THEM

(75) Inventors: Morris Lewellyn, Stratford, CT (US); Alan S. Rothenberg, Wilton, CT (US); Haunn-Lin Tony Chen, Darien, CT (US); Lino G. Magliocco, Shelton, CT (US); Thomas P. Sassi, Stamford, CT (US)

(73) Assignee: Cytec Technology Corp., Wilmington, DE (US)

( * ) Notice: Subject to any disclaimer, the term of this patent is extended or adjusted under 35 U.S.C. 154(b) by 69 days.

(21) Appl. No.: 13/329,963

(22) Filed: Dec. 19, 2011

(65) Prior Publication Data

US 2012/0153209 A1  Jun. 21, 2012

Related U.S. Application Data

(60) Provisional application No. 61/425,555, filed on Dec. 21, 2010.

(51) Int. Cl.
| | |
|---|---|
| *C02F 1/68* | (2006.01) |
| *C08F 220/56* | (2006.01) |
| *C08L 41/00* | (2006.01) |
| *C08L 43/00* | (2006.01) |
| *C08L 39/00* | (2006.01) |
| *C08F 8/30* | (2006.01) |
| *C08F 16/00* | (2006.01) |
| *C08F 18/22* | (2006.01) |
| *C08F 20/34* | (2006.01) |
| *C08F 20/42* | (2006.01) |
| *C08F 22/22* | (2006.01) |
| *C08F 26/00* | (2006.01) |
| *C08F 20/56* | (2006.01) |
| *C08C 19/22* | (2006.01) |
| *C08F 8/44* | (2006.01) |
| *B03D 1/001* | (2006.01) |

(52) U.S. Cl.
USPC ........ 210/749; 524/547; 524/555; 525/328.2; 525/329.4; 525/374; 252/60

(58) Field of Classification Search
None
See application file for complete search history.

(56) References Cited

U.S. PATENT DOCUMENTS

| | | | |
|---|---|---|---|
| 4,147,681 A | 4/1979 | Lim et al. | |
| 4,521,317 A | 6/1985 | Candau et al. | |
| 4,587,306 A | 5/1986 | Vio et al. | |
| 4,767,540 A | 8/1988 | Spitzer et al. | |
| 5,171,833 A * | 12/1992 | Schiessl | 528/486 |
| 5,302,696 A | 4/1994 | Schiessl | |
| 5,405,898 A | 4/1995 | Sommese | |
| 6,020,418 A * | 2/2000 | Heitner et al. | 524/547 |
| 6,235,162 B1 * | 5/2001 | Sharifian et al. | 203/74 |
| 6,608,137 B1 | 8/2003 | Heitner et al. | |
| 7,007,805 B2 | 3/2006 | Hughes | |

FOREIGN PATENT DOCUMENTS

| | | |
|---|---|---|
| WO | 2006/093588 A1 | 9/2006 |
| WO | WO2012087863 A1 | 6/2012 |

OTHER PUBLICATIONS

Material Safety Data Sheet, Hydrazine anhydrous, CAS# 302-01-2, ACC190 11040, Fisher Scientific, 2007.*
Material Safety Data Sheet, Hydrazine anhydrous, CAS# 302-01-2, ACC# 11040, Fisher Scientific, 2007.*
ISR/Written Opinion for PCT/US2011/065718 mailed on Oct. 19, 2012.

* cited by examiner

*Primary Examiner* — Nam Nguyen
*Assistant Examiner* — Clare Perrin
(74) *Attorney, Agent, or Firm* — David LeCroy

(57) ABSTRACT

Methods of producing microdispersions containing hydroxamated polymers by reacting water-in-oil microdispersions having vinyl polymers containing one or more pendant functional groups that react with hydroxylamine, with a hydroxylamine-free base substantially free of inorganic salt and containing less than 500 ppm hydrazine are disclosed herein, along with the microdispersions thereby obtained.

7 Claims, No Drawings

MICRODISPERSIONS OF HYDROXAMATED POLYMERS AND METHODS OF MAKING AND USING THEM

CROSS-REFERENCE TO RELATED APPLICATIONS

This application claims benefit of priority to U.S. Provisional Application No. 61/425,555 filed Dec. 21, 2010 the content of which is incorporated herein by reference in its entirety.

FIELD OF THE INVENTION

The present invention relates to microdispersions of hydroxamated polymers and methods of making them, as well as their use as flocculants, especially in the Bayer process.

BACKGROUND OF THE INVENTION

Polymers containing hydroxamate groups have been known to be particularly useful for the flocculation of red muds produced in the Bayer process, see U.S. Pat. No. 4,767,540. U.S. Pat. No. 6,020,418 describes the preparation of these hydroxamated polymers as water-in-oil microdispersions. The hydroxamated polymer microdispersions are high molecular weight polymers in which the hydroxamate functional group is introduced by the reaction of a suitable reactive functional group on the polymer, usually an amide from acrylamide monomer unit in the polymer, with a hydroxylamine salt, usually hydroxylamine sulfate, at a high pH. Since this known process requires the use of a base to convert the hydroxylamine salt to the free hydroxylamine that is reactive with the reactive functional group on the polymer and sufficient water to dissolve the by-product inorganic salt, the resulting hydroxamated polymer microdispersion is fairly dilute compared to the starting backbone polymer dispersion. There is a need to manufacture a more concentrated hydroxamated polymer dispersion, which could result in a more efficient manufacturing process with a higher throughput for the polymer. This would also mean that less material would need to be handled and shipped for the required polymer needed in the application. Another problem with the current technology using hydroxylamine salt is that the dispersion contains significant amounts of by-product salt, which is usually sodium sulfate or sodium chloride. Indeed, per hydroxamate group present on the polymer, an equivalent of inorganic salt is formed. The inorganic salts are undesirable impurities in the Bayer process which contribute to the scaling problem in these plants and contribute to the corrosivity of the Bayer liquor. These impurities build up as the liquor is recycled and can retard the recovery of alumina from solution, act as templates for the crystallization of aluminosilicates which coprecipitate with the alumina trihydrate, contribute to the deposition of scale on equipment (particularly in heaters contributing to reduced evaporation efficiencies), all of this leading to a requirement for increased plant size to accommodate the increased circulating load.

The present invention provides a method for preparing microdispersions of hydroxamated polymers and microdispersions of hydroxamated polymers which overcome these problems.

SUMMARY OF THE INVENTION

Applicants have found that these problems can be eliminated by the use of hydroxylamine free base instead of hydroxylamine salt. By hydroxylamine free base is meant $NH_2$—OH. Hydroxylamine free base is commercially available, for example as a 50% aqueous solution, but can also be prepared from the salt using ion exchange. However, Applicants have found that when a polyacrylamide water-in-oil microdispersion was reacted with commercially available hydroxylamine free base, the resulting hydroxamated polymer exhibited a low solution viscosity in water, which made the hydroxamated polymer ineffective as flocculant in the Bayer process. It is important for good performance in the flocculation of red mud in the Bayer process that the hydroxamated polymer has a high molecular weight without substantial branching or cross-linking for good solubility and chain extension in solution, which is characterized by high solution viscosity. Applicants have discovered that a hydrazine impurity in the commercially available hydroxylamine free base solutions was responsible for the generation of the reduced solution viscosity of the hydroxamated polymer. Analysis of different lots of 50% aqueous hydroxylamine free base solutions showed that the hydrazine content was in the range of 500-1200 ppm in solution or 1000-2400 ppm based on hydroxylamine. Without wanting to be bound to any theory, Applicants believe that under the conditions for the hydroxamation reaction, the hydrazine also reacts with the amide functional group and leads to the formation of the reduced solution viscosity, due to crosslinking.

The present invention therefore relates to a method of producing a microdispersion containing at least one hydroxamated polymer, which comprises reacting a) a water-in-oil micro-dispersion comprising a continuous phase of an oil and an emulsifier and a discontinuous aqueous phase comprising a vinyl polymer containing one or more pendant functional groups which will react with hydroxylamine, with b) a hydroxylamine free base substantially free of by-product salt and containing less than 500 ppm hydrazine based on hydroxylamine.

The method according to the present invention permits to obtain microdispersions containing a hydroxamated polymer substantially free of by-product salt. The present invention therefore relates to a microdispersion comprising at least one hydroxamated vinyl polymer and less than 1 equivalent of by-product salt per equivalent of hydroxamate group present on the polymer and to different applications and processes using this microdispersion.

The present invention further particularly relates to a process for removing suspended solids from an alumina recovery process wherein a hydroxamated polymer microdispersion according to the invention or obtained according to the method of the invention is used.

DETAILED DESCRIPTION

Exemplary of the vinyl polymers useful in the present invention are those which contain a pendant functional groups which will react with hydroxylamine, for example those produced from vinyl monomers such as unsaturated acids such as acrylic, methacrylic, crotonic acids etc.; acid esters such as methyl acrylate, ethyl acrylate, t-butyl acrylate, and the corresponding methacrylate esters; dimethylaminoethyl methacrylate; dimethylaminoethyl acrylate and quaternary salts thereof; methyl crotonate; polymers of maleic anhydride and esters thereof, and the like; nitrile polymers such as those produced from acrylonitrile etc.; amide polymers such as those produced from acrylamide, methacrylamide and the like. The above vinyl monomers may also be copolymerized with each other or with any other anionic, cationic or non-ionic monomer, or mixture thereof.

Preferred vinyl polymers are (co)polymers of acrylamide, methacrylamide, acrylic acid, methacrylic acid, acrylic esters and/or methacrylic esters. The term (co)polymer is meant to designate homopolymers as well as copolymers of the above mentioned monomers as well as copolymers with other monomers containing no pendant functional groups which will react with hydroxylamine, such as for example styrene. Most preferred are (co)polymers of acrylamide, acrylic acid and/or acrylic esters. Particularly preferred are (co)polymers of acrylamide. Polymers containing ester groups suitable for hydroxamation may also be derived by esterification of carboxylic acid groups by alkylating agents such as dimethyl sulfate or methyl chloride. For example acrylic esters can be introduced either by copolymerization or post-polymerization esterification of acrylic acid residues.

The vinyl polymers useful in the process according to the invention generally have a high molecular weight. Preferably the vinyl polymers have a weight average molecular weight of at least $1 \times 10^6$, more preferably of at least $5 \times 10^6$ and most preferably of at least $10 \times 10^6$.

The term microdispersion as used in the present invention is intended to include any such forms as microemulsions, emulsions, microsuspensions.

Any emulsifier which is effective such as to provide the proper average diameter of monomer-containing micro-droplets and to prevent the resultant vinyl polymer-containing micro-droplets, which generally range in average diameter size from about 0.02 to about 50 microns, preferably from about 0.1 to about 10 microns, and more preferably from about 0.2 to about 5 microns, from detrimentally agglomerating can be used in the process according to the invention. These emulsifiers are such that the microdispersion of the hydroxamated vinyl polymer remains free flowing i.e. does not experience the agglomeration of the gelled polymer solution micro-droplets such that it becomes incapable of flowing e.g. in the worst case scenario, solidified as a gelled mass.

Suitable emulsifiers useful for these purposes in the preparation of such water-in-oil microdispersions of the vinyl polymers to be hydroxamated include the ethoxylated fatty amines; the alkanolamides of fatty acids; imidazole-fatty acid reaction products; alkanolamine-fatty acid condensation products; sorbitan fatty esters, and the like. Preferably emulsifiers are chosen to result in the formation and maintenance of the polymer-containing micro-droplets ranging in size from about 0.02 to about 50 microns.

It may be advisable to add additional amounts of the same or different emulsifers to the emulsion to be hydroxamated so as to maintain the integrity thereof during the hydroxamation procedure i.e. the emulsion must be kept stable and gel-free during and after the hydroxamation reaction.

Any known hydrocarbon oil may be used in forming the microdispersion of polymers to be hydroxamated including isoparaffinic, normal or cyclic hydrocarbons such as benzene, xylene, toluene, fuel oil, kerosene, odorless mineral spirits, and mixtures thereof.

The ratio of aqueous phase to hydrocarbon phase in the microdispersions preferably ranges from about 0.5 to about 3.5:1, and more preferably approximates 2.5:1.

The procedure for forming the precursor vinyl polymer microdispersion is well known in the art and may be obtained from any of the U.S. Pat. Nos. 4,521,317 and 4,147,681 which teach the production of such microdispersions.

In the method of producing a microdispersion containing at least one hydroxamated polymer, the hydroxylamine free base generally contains less than 500 ppm hydrazine, preferably less than 200 ppm, more preferably less than 100 ppm and most preferably less than 20 ppm. Particularly preferred is hydroxylamine containing substantially no hydrazine. The amount of hydrazine is based on the total amount of hydroxylamine.

The hydroxylamine free base used in the present invention is generally used in the form of an aqueous solution, generally containing about 50% by weight or less of hydroxylamine free base.

The hydroxylamine free base is substantially free of by-product salt. By by-product salt is meant to designate any salt that results from the neutralization of hydroxylamine salts, such as hydroxylamine sulfates, sulfites, phosphates, chloride, acetate, propionates and the like, with a base such as sodium hydroxide. The hydroxylamine free base generally contains less than 0.5 wt %, preferably less than 0.1 wt % of salt. Hence hydroxylamine free base solutions containing hydroxylamine free base obtained by the neutralization of hydroxylamine salts, such as hydroxylamine sulfate or hydroxylamine chloride, with a base such as sodium hydroxide, and wherein the salts formed by this neutralization are still present in the solution are disclaimed from the present invention.

The hydroxylamine free base used in the process according to the invention may be obtained or prepared by any means. According to a first embodiment of the invention, a hydroxylamine free base is used which is obtained by treating a hydroxylamine free base containing hydrazine with a scavenger agent which shows significant selectivity for the hydrazine in the presence of large amounts of hydroxylamine. The scavenging agent is preferably selected among those reagents for which the reaction product of the scavenging reagent and hydrazine is stable under the further processing conditions of the hydroxylamine so that no hydrazine is released during further processing. The scavenging agent is more preferably selected from compounds of formula I and/or II wherein

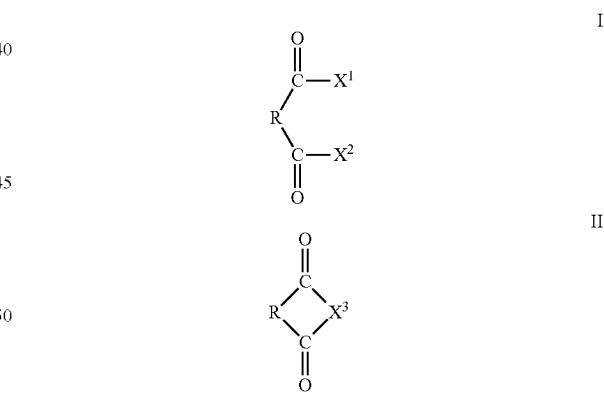

$X^1$ and $X^2$, each individually, are H, OH, NR"$_2$, OR''', SH, halide or an optionally substituted hydrocarbyl group, with the proviso that not both of $X^1$ and $X^2$ are OH groups, wherein each R", individually, is H or an optionally substituted hydrocarbyl group, R''' is an optionally substituted hydrocarbyl group wherein two R''' groups can also form an optionally substituted ring system; or R''' is an alkali metal (especially Na) or NR$^V_4$ wherein each R$^V$, individually, is H or an optionally substituted hydrocarbyl group;

$X^3$ is O, NR', S, or PR' wherein R' is H, OH, alkali metal (especially Na or K), NR$^{IV}_2$ or alkyl, wherein each R$^{IV}$, individually, is H or an optionally substituted hydrocarbyl group;

R is $CR^1R^2$ where $R^1$ and $R^2$ are, each independently, H or an optionally substituted hydrocarbyl group, wherein $R^1$ and $R^2$ can also form an optionally substituted ring, or R is $R^3C=CR^4$ where $R^3$ and $R^4$ together form an optionally substituted ring, preferably an optionally substituted aromatic ring, or R is $R^5R^6C—CR^7R^8$ where $R^5$ and $R^7$ together form an optionally substituted ring, and $R^6$ and $R^8$ are, each independently, H or an optionally substituted hydrocarbyl group, with the proviso that $R^1$ can form a ring system with $X^1$.

$X^1$ and $X^2$, each individually, are preferably an alkyl group comprising from 1 to 6 carbon atoms, more preferably methyl or ethyl; or $OR'''$ wherein $R'''$ is an alkyl group comprising from 1 to 6 carbon atoms, more preferably methyl or ethyl, or two $R'''$ groups can be connected to form a ring; or $NR''_2$ wherein each $R''$, individually is H or an alkyl group comprising from 1 to 6, more preferably from 1 to 4, carbon groups.

$X^3$ is preferably O, NH or N—OH.

R is preferably $CR^1R^2$ where $R^1$ and $R^2$ are, each independently, H or alkyl groups; or $R^3C=CR^4$ where $R^3$ and $R^4$ together form an optionally substituted aromatic ring system.

$R^1$, $R^2$, $R^6$ and $R^8$ are preferably, each independently, H or alkyl groups comprising from 1 to 6, more preferably from 1 to 4, carbon groups, especially methyl and ethyl.

Preferably $R^3$ and $R^4$ together form an optionally substituted aromatic ring system. The substituents on the aromatic ring can be selected from alkyl groups containing from 1 to 6 carbon atoms, nitro groups and imide groups.

By hydrocarbyl is meant an univalent radical derived from a hydrocarbon, i.e. compounds comprising carbon and hydrogen, and include aliphatic hydrocarbons such as alkyls, alkenyls, as well as cyclic compounds, such as alicyclic compounds and aromatic compounds, as well as combinations thereof. By substituted is meant to designate in the present invention, hydrocarbyl groups wherein one or more hydrogen or one or more carbon atom are replaced by another atom or group, such as an halogen, a nitro group, an imide group, a hydroxyl group, an oxygen atom, a sulfur atom, a carboxyl group, an ether group, etc. By optionally substituted is meant to designate both unsubstituted and substituted moieties.

The compound of formula II is preferably a compound wherein R is $R^3C=CR^4$.

The scavenging reagent is preferably selected from the group of phthalimide; substituted phthalimides bearing one or more groups on the aromatic ring, such as 4-methyl phthalimide and 4-nitrophthamide; substituted phthalimides bearing an alkyl or hydroxy group on the N atom, such as N-hydroxy phthalimide, or the salt of phthalimide such as the potassium or sodium salt; 1,3 diketones, such as acetylacetone; 1,3 diketones with alkyl substitution on the 2 carbon, such as 3-methyl-2,4-pentanedione; 1,3 ketoesters optionally substituted in the 2-position, such as ethyl acetoacetate and ethyl 2-methylacetoacetate; pyromellitic diimide, phthalic anhydride, phthaloyl chloride and phthalamic acid. The scavenging reagent is more preferably selected from the group of phthalimide; substituted phthalimides bearing one or more electron donating groups on the aromatic ring, such as 4-methyl phthalimide; N-substituted phthalimides, such as N-hydroxy phthalimide; 1,3 diketones with alkyl substitution on the 2 carbon, such as 3-methyl-2,4-pentanedione; pyromellitic diimide. Most preferred are phthalimide, 4-methyl phthalimide, N-hydroxy phthalimide, 3-methyl-2,4-pentanedione and pyromellitic diimide.

According to another embodiment of the invention, a hydroxylamine free base is used that is obtained by a process in which the formation of hydrazine is prevented or limited.

According to another embodiment of the invention, a hydroxylamine free base is used which is obtained by treating a hydroxylamine free base in any other way in order to eliminate hydrazine.

In the method according to the invention, the hydroxylamine free base is preferably used in conjunction with a base, such as potassium hydroxide, sodium hydroxide, ammonia, etc. or any mixtures thereof. The preferred base is sodium hydroxide. The amount of base used is preferably at least equivalent to the amount (on a molar basis) needed to neutralize the resulting hydroxamic acid groups present on the hydroxamated polymer. More preferably the base is used in excess of the amount needed to neutralize the resulting hydroxamic acid groups. Most preferably more than about 5% excess over the minimum required to neutralize the resulting hydroxamic acid groups is used.

The hydroxamation reaction may be conducted at a temperature from about 5° C. to about 90° C., preferably from about 15° C. to about 60° C., more preferably about 15° C. to 40° C.

The degree of hydroxamation, i.e, the concentration of hydroxamate units in the polymers useful herein, may range from about 1 to about 100 mole percent, preferably from about 5 to about 75 mole percent and, most preferably, from about 10 to about 65 mole percent based on all of the monomer units. The remainder of the functional groups that can react with hydroxylamine present on the vinyl polymer may be unreacted or may undergo further reaction, for example with the base. When (co)polymers of acrylamide are used, an excess of base usually leads to the hydrolysis of at least part of the amide groups so that carboxylate groups are formed.

In a preferred embodiment of the method of the invention, a stabilizer suitable to stabilize the vinyl polymer against degradation due to the presence of hydroxylamine is added to the hydroxylamine free base. Suitable stabilizers include water-soluble alkali metal, alkaline earth metal or ammonium thiosulfates; 2-mercaptothiazoles; 2-mercaptothiazolines; thiuram disulfides; thioureas; mercaptoalkanols.

In the method according to the invention, the hydroxylamine free base, excess base and, preferably, the stabilizer is added to and reacted with the precursor vinyl polymer microdispersion in the form of an aqueous solution or as an emulsion. Preferably, the compounds are used in the form of a solution. The emulsion may be formed by adding an aqueous solution of the compounds to any of the oils described above in the presence of an emulsifier such as those disclosed above. The same emulsifier used to form the vinyl polymer microdispersion to be hydroxamated may be used in the formation of the hydroxylamine emulsion charge. A different emulsifier or mixture of emulsifiers may also be used. It is preferred, however, that the result of the presence of the emulsifier(s) is such that the hydroxylamine solution goes into the aqueous phase of the precursor microdispersion and the final hydroxamated vinyl polymer dispersion is stable and gel-free. Homogenization of the aqueous solution with the oil and emulsifier is preferred; however, a useful crude emulsion may be attained by merely stirring said components. Alternatively, the hydroxylamine, excess base and stabilizer can be added directly to the precursor vinyl polymer microdispersion to which may be added, additional oil and emulsifier, with stirring as long as the above discussed criteria are met. Still further, each individual component, i.e. the hydroxylamine, the excess base and the stabilizer, may be formed into individual emulsions and added as such to the precursor vinyl polymer microdispersion.

The degree of hydroxamation is controlled by the ratio of the added hydroxylamine reagent to the precursor vinyl polymer back-bone reactive groups, as is known in the art. The instant method results in a very high conversion of hydroxylamine. The degree of hydroxamation may be determined by carbon 13 Nuclear Magnetic Resonance spectroscopy and is quoted herein in mole percent.

The hydroxamated vinyl polymer relative molecular weights may be determined by ascertaining the viscosity of a dilute polymer solution in molar sodium chloride. The Solution Viscosity (SV), as used herein, is determined on a 0.1%, based on the precursor polymer, polymer solution in 1M NaCl at 25° C. using a Brookfield viscometer with UL adapter at 60 rpm. The UL adaptor is an adaptor used with the Brookfield LV viscometer for low viscosity fluids (<20 mPa·s); this adaptor consists of a cup and spindle that fits into the cup with only about 1 mm clearance to measure the viscosity. The limit for measuring viscosity at 60 rpm is 10 mPa·s. For those polymers that have SV greater than 10, measurement is done at 30 rpm and the value obtained is converted to what it would be at 60 rpm using the following relationship: SV=exp.{ln 30 rpm viscosity-0.162}. SV is quoted in mPa·s. The Solution Viscosity is a measure that is related to the molecular weight of the hydroxamated polymer. The relationship between Solution Viscosity and molecular weight of a polymer can be determined by size exclusion chromatography, lights scattering, and other techniques known to those skilled in the art. The method according to the invention permits one to obtain hydroxamated vinyl polymer water-in-oil microdispersions having Solution Viscosities of over about 2.0 mPa·s, in particular at least 10 mPa·s. It has been known that such polymers are very efficient flocculants, especially in the Bayer process. The polymers can also be used for a number of other applications.

The method according to the invention permits one to obtain hydroxamated vinyl polymer water-in-oil microdispersions having a low level of salts, in particular less than 1 equivalent of byproduct salt per equivalent of hydroxamate group present on the polymer. The method according to the invention permits to obtain vinyl polymer water-in-oil microdispersions having a low level of salts, in particular less than 0.5 wt %, eg. less than 0.1 wt %, of byproduct salt. The water-in-oil microdispersions are substantially free of byproduct salts as defined here above.

The method according to the invention permits to obtain hydroxamated vinyl polymer water-in-oil microdispersions having a higher concentration than the hydroxamated vinyl polymer water-in-oil microdispersions known from the prior art which have been prepared starting from hydroxylamine salts.

Therefore the present invention further relates to hydroxamated vinyl polymer water-in-oil microdispersions obtainable and obtained by the method according to the invention as described here above.

The present invention therefore relates to hydroxamated vinyl polymer water-in-oil microdispersions comprising at least one hydroxamated vinyl polymer and less than 1 equivalent of by-product salt per equivalent of hydroxamate group present on the polymer. The vinyl polymer water-in-oil microdispersions generally contain less than 0.5 wt %, eg. less than 0.1 wt %, of byproduct salt. The water-in-oil microdispersions are more preferably substantially free of by-product salts as defined here above.

The present invention therefore relates to hydroxamated vinyl polymer water-in-oil microdispersions comprising at least 18% by weight, preferably at least 20% by weight of polymer, calculated on the basis of the vinyl polymer before hydroxamation. The % by weight of polymer in the hydroxamated vinyl polymer water-in-oil microdispersions is calculated based on the weight of the vinyl polymer used in the synthesis and the total weight of all other reactants, compounds, oil and water added to the reaction mixture.

The hydroxamated vinyl polymer water-in-oil microdispersions according to the invention generally have Solution Viscosities of over about 2.0 mPa·s, in particular at least 10 mPa·s.

The hydroxamated vinyl polymer water-in-oil microdispersions according to the invention generally are stable, gel-free water-in-oil microdispersions comprising 1) a continuous phase of a hydrocarbon oil and an emulsifier which is effective so as to prevent the detrimental agglomeration of polymer-containing micro-droplets and 2) a discontinuous phase comprising micro-droplets containing a hydroxamated vinyl polymer.

The other characteristics of the microdispersions have been described here above in relation to the method of the invention. The preferred hydroxamated vinyl polymers are (co)polymers of acrylamide, more preferably having a molecular weight of over about 1,000,000. The hydroxamate group content of the polymer is preferably at least 5 mole % based on monomer units in the polymer. The hydroxamate group content is more preferably from 5 to about 75 mole % and, most preferably, from about 10 to about 65%.

The hydroxamated vinyl polymer water-in-oil microdispersions of this invention can be dissolved directly in water to form aqueous solutions which may be used as, for example, flocculants. Additionally, a breaker emulsifier may be added to the microdispersions or dilution water to which the microdispersion is added to help invert the microdispersion and thereby improve the dissolution characteristics, if necessary or desired. Additionally, the hydroxamated vinyl polymer may be isolated from the microdispersion in the form of a dry powder, such as by precipitation in a non-solvent or by drying. The hydroxamated vinyl polymer water-in-oil microdispersions of this invention may also be used to prepare water-in-oil-in-water microdispersions as described in WO2006/093588.

The hydroxamated vinyl polymer water-in-oil microdispersion of this invention is particularly useful to be used as a flocculant, in particular in the Bayer process. The present invention further relates to a process for flocculation and separation of suspended solids from an industrial process stream comprising suspended solids, wherein a hydroxamated polymer microdispersion according to the invention or obtained according to the method of the invention is used. The hydroxamated polymer microdispersion may be added directly to a process stream, or may first be diluted or dissolved in water before being added to a process stream. Alternatively a water-in-oil-in-water microdispersion as described in WO2006/093588 may be formed and added to the process stream. The industrial process stream can be any stream from which solids need to be separated. Preferably this process stream is a Bayer process stream, eg. one containing red mud or alumina trihydrate solids.

EXAMPLES

The following examples demonstrate the unique properties of the invention. In the examples hereunder the following analytical methods have been used:

The hydrazine content in hydroxylamine free base was determined in accordance with the method of G. W. Watt and J. D. Chrisp, Analytical Chemistry, 24, 2006 (1952). The color reagent employed had the following composition: p-dimethylaminobenzaldehyde, 0.4 g; ethanol, 20.0 ml; and concentrated hydrochloric acid, 2.0 ml. The 50% hydroxylamine free base solution was generally diluted 1:10 for the analysis. Into a 10 ml volumetric flask was placed 2 ml of the color reagent and 50 µl of the diluted hydroxylamine free base solution, and deionized water to the mark. The flask was shaken and allowed to stand for at least 10 minutes to ensure that the color formation is complete. The absorbance is measured at 454 nm wavelength and the hydrazine concentration calculated based on the calibration curve. To obtain a lower limit of about 1 ppm hydrazine concentration, 25 µl of undiluted sample was used with 4 ml of color reagent. It is important that enough p-dimethylaminobenzaldehyde is used to react with both the hydrazine and hydroxylamine in the sample to obtain the proper color response.

The degree of hydroxamation may be determined by carbon-13 Nuclear Magnetic Resonance spectroscopy and is quoted herein in mole percent.

Example 1

Preparation hydroxylamine free base 1.0 g of phthalamic acid (97% purity, Aldrich) is added to 20 g of an aqueous solution containing 50% hydroxylamine free base (commercially available from Aldrich) containing 650 ppm of hydrazine (that is 1300 ppm based on hydroxylamine HA). The solution is stirred at 60° C. for 4 hours. After the treatment, hydrazine level in hydroxylamine free base solution has been determined to be near 0 ppm.

Example 2

Preparation of hydroxamated polyacrylamide microdispersion Using Hydroxylamine Free Base Pre-Treated with Phthalamic Acid An ultra high molecular weight (≥15 million) water-in-oil inverse polyacrylamide microdispersion with 31.83% polymer solids is prepared following the teaching in U.S. Pat. No. 4,587,306 (Vio). This microdispersion is used for the preparation of hydroxamated polymer microdispersion as described in the following. 263.2 g of polyacrylamide microdispersion, 31.5 g of paraffin oil, and 1.75 g of an ethoxylated fatty amine emulsifier are charged into a reactor. The microdispersion is agitated until reaching a homogeneous dispersion. Meanwhile, a solution for hydroxamating the polymer is prepared in a separate vessel by mixing 16.65 g of the pre-treated hydroxylamine free base solution as obtained in Example 1, 1.0 g of de-ionized water, and 9.3 g of sodium thiosulfate. To this solution, 86.43 g of a 50% sodium hydroxide solution is charged slowly while stirring. The temperature is controlled below 30° C. during the addition of sodium hydroxide. To conduct hydroxamation, the hydroxamation solution is added slowly into the polyacrylamide microdispersion in the reactor over 16 minutes. 15 minutes after charging the hydroxamation solution, 3.4 g of an ethoxylated nonylphenol surfactant is charged. 30 minutes later 2.5 g of a 30% sodium hydrogen sulfide solution is added and the microdispersion is agitated for an additional hour to finish the reaction. The hydroxamated-polyacrylamide product has 20.15 wt % polymer solids (calculated based on polyacrylamide). The resulting stable gel-free microdispersion has a Solution Viscosity (SV) of 11.1 mPa·s after one day and 9.5 mPa·s after 1 week.

This example demonstrates that a stable high molecular weight hydroxamated polymer microdispersion with a greater than 20 wt % polymer solids can be prepared by the use of a phthalamic acid treated hydroxylamine free base solution. This is significantly higher than the hydroxamated polymer dispersions described in the prior art. Prior art example 3 of U.S. Pat. No. 6,020,418 has been reproduced: the hydroxamated polymer dispersion had a 16 wt % polymer solids (calculated based on polyacrylamide).

Comparative Example 3

The same process as in Example 2 is conducted to prepare this comparative example. The only difference is that, an un-treated hydroxylamine free base solution is used instead of the pre-treated hydroxylamine solution. The resulting stable gel-free microdispersion has a Solution Viscosity of 2.5 mPa·s after one day and 2.8 mPa·s after 1 week. This example shows that, without treating hydroxylamine free base with an effective hydrazine scavenger the produced hydroxamated polyacrylamide microdispersion has a substantially lower Solution Viscosity.

Example 4

An aqueous solution containing 50% hydroxylamine free base containing about 688 ppm of hydrazine (1376 ppm based on HA) was treated with 0.1 g of pyromellitic diimide at room temperature with stirring. After 1 h and 15 minutes, the hydrazine content of the solution was 100 ppm (200 ppm based on hydroxylamine).

Examples 5 and 6

20 g of an aqueous solution containing 50% hydroxylamine free base (HA) containing about 955 ppm of hydrazine (1910 ppm based on HA) was treated at room temperature under stirring with different reactants and during different time periods as shown in Table 1. After the treatment, the amount of hydrazine was measured.

TABLE 1

| Reactant | Reactant (g) | Temp ° C. | Time | Hydrazine ppm on HA |
|---|---|---|---|---|
| Benzoyl acetone | 1.2 | 20 | 7.5 h | 490 |
| Phthalimide | 0.13 | 20 | 5.25 h | 26 |

Example 7

15 g of 50% aqueous hydroxylamine free base (obtained from BASF), containing 970 ppm hydrazine (1940 ppm based on HA), was treated with phthalimide under the conditions shown in Table 2 to examine the effect of stoichiometry based on hydrazine, time, and temperature on the efficiency for hydrazine removal. The results are shown in Table 2.

TABLE 2

| Phthalimide (g) | Equivalents on Hydrazine | Temp. ° C. | Time, min | Hydrazine, ppm on HA |
|---|---|---|---|---|
| 0.2445 | 3.66 | 20 | 15 | 156 |
| 0.2445 | 3.66 | 40 | 15 | 12 |
| 0.0815 | 1.22 | 20 | 45 | 292 |
| 0.0815 | 1.22 | 20 | 15 | 980 |
| 0.2445 | 3.66 | 20 | 45 | 14 |
| 0.0815 | 1.22 | 40 | 15 | 418 |
| 0.0815 | 1.22 | 40 | 45 | 50 |
| 0.2445 | 3.66 | 40 | 45 | 14 |

Examples 8 and 9

Example 7 was repeated except that phthalimide was replaced by, respectively, 3-methyl-2,4-pentadione and phthalamic acid. The results are shown in Tables 3 and 4.

TABLE 3

| 3-Methyl-2,4-pentanedione (g) | Equivalents on Hydrazine | Temp., °C. | Time, min | Hydrazine ppm on HA |
|---|---|---|---|---|
| 0.190 | 3.66 | 20 | 15 | 440 |
| 0.190 | 3.66 | 20 | 45 | 172 |
| 0.063 | 1.22 | 40 | 15 | 982 |
| 0.190 | 3.66 | 40 | 15 | 310 |
| 0.063 | 1.22 | 40 | 45 | 1018 |
| 0.063 | 1.22 | 20 | 15 | 1214 |
| 0.190 | 3.66 | 40 | 45 | 310 |
| 0.063 | 1.22 | 20 | 45 | 1010 |

TABLE 4

| Phthalamic Acid (g) | Equivalents on Hydrazine | Temp., °C. | Time, hr | Hydrazine, ppm on HA |
|---|---|---|---|---|
| 0.4 | 8 | 60 | 4 | 356 |
| 0.4 | 8 | 60 | 2 | 1170 |
| 0.8 | 16 | 20 | 4 | 1706 |
| 0.8 | 16 | 20 | 2 | 1688 |
| 0.4 | 8 | 20 | 4 | 1740 |
| 0.4 | 8 | 20 | 2 | 1734 |
| 0.8 | 16 | 60 | 4 | 12 |
| 0.8 | 16 | 60 | 2 | 330 |

Tables 1, 2, 3 and 4 show that the reagents used are efficient scavengers of hydrazine present in hydroxylamine free base.

Examples 10 to 24

Example 1 has been repeated except that the phtalamic acid has been replaced by the reagents and with treatment conditions described in Table 5. The residual amount of hydrazine was measured after treatment.

TABLE 5

| Example | Treating Reagent | Reagent Conc., wt % | Treatment Conditions | Hydrazine, ppm on HA |
|---|---|---|---|---|
|  | None | N/A | N/A | 1300 |
| 1 | Phthalamic acid | 4.9% | 4 hrs @60° C. | <2 |
| 10 | Cis-1,2,3,6-Tetrahydrophthalimide | 6.6% | 6 hrs @60° C. | 798 |
| 11 | Acetylcyclopentanone | 5.6% | 6 hrs @60° C. | 826 |
| 12 | Acetylacetone | 4.5% | 4 hrs @60° C. | 2 |
| 13C | Succinimide | 2.8% | 2 hrs @60° C. | 1374 |
| 14 | Phthalic anhydride | 2.2% | 1 hr @60° C. | 2 |
| 15 | Ethyl acetoacetate | 5.8% | 6 hrs @60° C. | 660 |
| 16 | Ethyl 2-methylacetoacetate | 6.6% | 6 hrs @60° C. | 192 |
| 17 | Phthalimide | 3.0% | 3 hrs @60° C. | 0 |
| 18 | N-Hydroxyphthalimide | 6.1% | 4 hrs @60° C. | 6 |
| 19 | 4-Methylphthalimide | 6.0% | 4 hrs @60° C. | 8 |
| 20 | 3-Methyl-2,4-pentanedione | 4.3% | 4 hrs @60° C. | 38 |
| 21C | Phthalic acid | 5.0% | 4 hrs @60° C. | 1154 |
| 22C | 2,5-Hexanedione | 4.9% | 4 hrs @60° C. | 1248 |
| 23 | Phthaldialdehyde | 4.9% | 4 hrs @60° C. | 858 |
| 24 | Phthalimide, potassium salt | 4.0% | 2 hrs @60° C. | 8 |
| 25 | Phthaloyl chloride | 3.6% | 2.5 hr @5-60° C. | 2 |

Note that Examples 13C, 21C and 22C are comparative examples

Examples 26 to 42 and Comparative Example 43

Examples 26 to 42 and comparative example 43 are hydroxamated polyacrylamide microdispersions prepared as described in Example 2 except that a commercial hydroxylamine free base solution (initially comprising 650 ppm hydrazine in solution, or 1300 ppm on hydroxylamine) pretreated with the reagents and under the conditions as described in Table 6 were used instead of the hydroxylamine free base of Example 1. Table 6 summarizes the Solution Viscosities of the resulting hydroxamated polymer microdispersions measured after 1 day and 1 week.

TABLE 6

| Example | Treating Reagent of | Reagent Conc., wt % | Treatment Conditions | Hydrazine ppm on HA | SV (1 day) | SV (1 week) |
|---|---|---|---|---|---|---|
| 26 | Phthalimide | 3.0% | 3 hrs @60° C. | <2 | 12.9 | 12.2 |
| 27C | Maleimide | 5.0% | 4 hrs @60° C. | NM | 1.7 | 1.9 |
| 28 | Cis-1,2,3,6-Tetrahydrophthalimide | 6.6% | 6 hrs @60° C. | 798 | 2.6 | 2.8 |
| 29 | Acetylcyclopentanone | 5.6% | 6 hrs @60° C. | 826 | 2.4 | 2.6 |
| 30 | Acetylacetone | 4.5% | 4 hrs @60° C. | 2 | 7.5 | 8.1 |
| 31C | Succinimide | 2.8% | 2 hrs @60° C. | 1374 | 2.1 | 2.2 |
| 32 | Phthalic anhydride | 2.2% | 1 hr @60° C. | 2 | 7.2 | 7.2 |
| 33 | Ethyl acetoacetate | 5.8% | 6 hrs @60° C. | 660 | 4.0 | 4.5 |
| 34 | Ethyl 2-methylacetoacetate | 6.6% | 6 hrs @60° C. | 192 | 7.7 | 7.8 |
| 35C | Maleic anhydride | 2.6% | 16 hrs @60° C. | NM | 3.8 | 3.4 |
| 36 | N-Hydroxyphthalimide | 6.1% | 4 hrs @60° C. | 6 | 10.4 | 9.9 |
| 37 | 4-Nitrophthalimide | 7.1% | 4 hrs @60° C. | NM | 10.3 | 9.9 |
| 38 | 4-Methylphthalimide | 6.0% | 4 hrs @60° C. | 8 | 12.6 | 12.3 |
| 39 | 3-Methyl-2,4-pentanedione | 4.3% | 4 hrs @60° C. | 38 | 12.1 | 13 |
| 40C | Phthalic acid | 5.0% | 4 hrs @60° C. | 1154 | 2.3 | 2.2 |
| 41C | 2,5-Hexanedione | 4.9% | 4 hrs @60° C. | 1248 | 2.3 | 2.2 |
| 42 | Phthaldialdehyde | 4.9% | 4 hrs @60° C. | 858 | 3.1 | 3.2 |
| 43 | none | N/A | N/A | 1300 | 1.7 | 1.8 |

Note that Examples 27C, 30C, 35C, 40C and 41C are comparative examples

Table 6 shows that hydroxylamine free base pre-treated with a sufficient amount of the right selective scavengers will permit one to obtain solution viscosities that are high (>4 mPa·s, and preferably >10 mPa·s. In the table, NM means not measured. Maleimide, succinimide, and maleic anhydride were less or insufficient hydrazine scavengers and low solution viscosities were obtained. Many of the other hydrazine scavengers were not used in sufficient amount to result in a low enough hydrazine content to give a high solution viscosity of >10 mPa·s, but did lower the hydrazine content enough to give a solution viscosity that is greater than when no scavenger was used.

Example 44

A high molecular weight (≥15 million) water-in-oil inverse polyacrylamide microdispersion with 31.83% polymer solids is prepared as described in Example 2. In a separate vessel, 15.72 g of a hydroxylamine free base solution pre-treated with 1% phthalimide for 16 hrs. at room temperature, 1.27 g de-ionized water, and 11.83 g sodium thiosulfate was added. To this solution, 86.43 g of 50% sodium hydroxide solution was charged slowly while stirring, maintaining the temperature below 30° C. This hydroxamation solution was added slowly into the polyacrylamide microdispersion in the reactor over 16 minutes. After 15 minutes of stirring, 3.4 g of an ethoxylated nonylphenol surfactant was charged. 30 minutes later, 2.5 g of a 30% sodium hydrogen sulfide solution was added and the microdispersion was agitated for an additional hour to finish the reaction. The hydroxamated polyacrylamide product has 20.19% polymer solids (calculated based on polyacrylamide). The resulting stable gel-free microdispersion has a Solution Viscosity of 13.3 mPa·s after one day and 12.8 mPa·s after three days.

Example 45

A synthetic Bayer liquor is made by adding 256 g sodium aluminate, 66 g sodium hydroxide, and 40 g sodium carbonate to water to make a total of 1000 ml and heating to 100° C. For the settling tests, red mud solids (obtained from mud slurry typically being discharged to waste at an operating Bayer plant) are mixed with the synthetic liquor, generally giving a slurry containing about 40 g/l suspended solids. Dilute reagent is mixed into the slurry contained in a graduated cylinder, using a perforated plunger, and the time to settle a fixed distance is measured so that a settling rate for the flocculated solids can be calculated. After thirty minutes, a sample of the supernatant liquor is taken and filtered; the solids collected on the filter are then washed and dried to give a measure of the supernatant clarity.

The high solids hydroxamated polymer microdispersion prepared in Example 44 was tested in the synthetic red mud slurry and compared to a lower solids hydroxamated polymer microdispersion (16.7% polymer solids based on backbone polyacrylamide, prepared by the method of Heitner and Ryles, disclosed in U.S. Pat. No. 6,608,137) which also contains 3.35% of sodium sulfate generated from the neutralization of the hydroxylamine sulfate with sodium hydroxide. The results are shown in the table below:

TABLE 7

| Hydroxamated polymer used | As Is Dose (g/t) | Settling Rate (m/hr) | Overflow Solids (g/l) |
|---|---|---|---|
| Comparative (16.7% polymer) | 32.1 | 4.9 | 1.5 |
|  | 36.4 | 9.1 | 1.1 |
|  | 43.0 | 14.9 | 0.8 |

TABLE 7-continued

| Hydroxamated polymer used | As Is Dose (g/t) | Settling Rate (m/hr) | Overflow Solids (g/l) |
|---|---|---|---|
| Example 44 | 26.8 | 6.4 | 1.0 |
|  | 30.3 | 8.9 | 0.8 |
|  | 35.7 | 12.7 | 0.7 |

These results show that the higher solids hydroxamated polymer microdispersions of Example 44 give proportionately higher performance than the lower solids comparative product.

Example 46

In Example 46 a hydroxamated polyacrylamide was prepared as described in Example 2 except that an ultra high molecular weight (>15 million) water-in-oil inverse polyacrylamide microdispersion is used with 36.9% polymer solids. This polyacrylamide microdispersion is obtained by submitting the polyacrylamide microdispersion as described in Example 2 to a vacuum distillation at 45° C. for 5 hours. The hydroxamation is carried out as described in Example 2 except that a hydroxylamine free base solution pre-treated with 0.6% phthalimide for 2 hours at 40° C. is used. The final product is a stable hydroxamated polymer microdispersion with 22.5 weight % polymer solids (calculated based on polyacrylamide) and a SV of 10.5 mPa·s.

We claim:

1. A method of producing a microdispersion containing at least one hydroxamated polymer, said method comprising:

obtaining an hydroxylamine-free base by treating a hydroxylamine-free base substantially free of inorganic salt and containing hydrazine with a scavenger agent having significant selectivity for the hydrazine in the presence of large amounts of hydroxylamine, and reacting a) a water-in-oil microdispersion comprising a continuous phase of an oil and an emulsifier and a discontinuous aqueous phase comprising a vinyl polymer containing one or more pendant functional groups which will react with hydroxylamine, with b) the hydroxylamine-free base substantially free of inorganic salt and containing less than 500 ppm hydrazine based on hydroxylamine.

2. The method according to claim 1, wherein the vinyl polymer is selected from (co)polymers of acrylamide, acrylic acid and acrylic esters.

3. The method according to claim 1, wherein the hydroxylamine-free base contains less than 20 ppm hydrazine.

4. The method according to claim 3, wherein the hydroxylamine-free base is substantially free of hydrazine.

5. The method according to claim 1, wherein the scavenging agent is selected from compounds of formula I and/or II

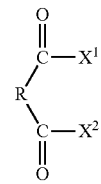

I

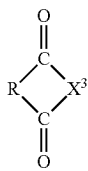

wherein,
each of $X^1$ and $X^2$ is independently chosen from: H, OH, $NR''_2$, $OR'''$, SH, halide or an optionally substituted hydrocarbyl group, with the proviso that not both of $X^1$ and $X^2$ are OH groups, wherein each $R''$ is independently chosen from: H or an optionally substituted hydrocarbyl group; $R'''$ is an optionally substituted hydrocarbyl group wherein two $R'''$ groups can also form an optionally substituted ring system; or $R'''$ is an alkali metal;

$X^3$ is O, NR', S, or PR' wherein R' is H, OH, alkali metal, $NR^{IV}_2$ or alkyl, wherein each $R^{IV}$ is independently chosen from: H or an optionally substituted hydrocarbyl group;

R is chosen from:
$CR^1R^2$ where each of $R^1$ and $R^2$ is independently chosen from: H or an optionally substituted hydrocarbyl group, wherein $R^1$ and $R^2$ can also form an optionally substituted ring;
$R^3C{=}CR^4$ where $R^3$ and $R^4$ together form an optionally substituted ring; and
$R^5R^6C{-}CR^7R^8$ where $R^5$ and $R^7$ together form an optionally substituted ring, and wherein each of $R^6$ and $R^8$ is independently chosen from: H or an optionally substituted hydrocarbyl group,
with the proviso that $R^1$ can form a ring system with $X^1$.

6. The method according to claim 1, wherein the scavenging agent is selected from the group of phthalimide; substituted phthalimides bearing one or more electron donating groups on the aromatic ring; N-substituted phthalimides; 1,3 diketones with alkyl substitution on the 2 carbon; and pyromellitic diimide.

7. The method according to claim 1, wherein the hydroxylamine-free base is used in conjunction with an excess of base selected from the group consisting of potassium hydroxide, sodium hydroxide, ammonia, and mixtures thereof.

* * * * *